(12) United States Patent
Zeng et al.

(10) Patent No.: US 12,328,409 B2
(45) Date of Patent: Jun. 10, 2025

(54) MEDIA CONTENT SHARING METHOD, APPARATUS, ELECTRONIC DEVICE AND STORAGE MEDIUM

(71) Applicant: Beijing Zitiao Network Technology Co., Ltd., Beijing (CN)

(72) Inventors: Xueer Zeng, Beijing (CN); Lingling Zheng, Beijing (CN); Licong Song, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/511,753

(22) Filed: Nov. 16, 2023

(65) Prior Publication Data

US 2024/0106928 A1    Mar. 28, 2024

Related U.S. Application Data

(63) Continuation of application No. PCT/CN2023/115432, filed on Aug. 29, 2023.

(30) Foreign Application Priority Data

Sep. 26, 2022 (CN) .......................... 202211177498.X (51) Int. Cl.
*H04M 1/72469* (2021.01)

(52) U.S. Cl.
CPC ................ *H04M 1/72469* (2021.01)

(58) Field of Classification Search
CPC ......... H04M 1/72469; H04M 1/72547; H04M 1/72583; H04M 1/72527; H04W 4/12;

(Continued)

(56) References Cited

U.S. PATENT DOCUMENTS

2012/0309463 A1* 12/2012 Lee ..................... G06F 3/04883
                                                                   455/566
2014/0059478 A1    2/2014 Dearman et al.
(Continued)

FOREIGN PATENT DOCUMENTS

AU    2018353923 A1    5/2020
CN    106293338 A    1/2017
(Continued)

OTHER PUBLICATIONS

China National Intellectual Property Administration, Notice of Allowance Issued in Application No. 202211177498.X, Dec. 29, 2023, 5 pages.

(Continued)

*Primary Examiner* — Jinsong Hu
*Assistant Examiner* — Alexander J Yi
(74) *Attorney, Agent, or Firm* — Alleman Hall & Tuttle LLP (57) ABSTRACT

A media content sharing method, apparatus, electronic device, and storage medium. The method includes: displaying target media content on a media content display page; in response to a display operation on a target user to share with, displaying a user identification of at least one user to share with in a preset area of the media content display page, wherein a background screen of the preset area is associated with the target media content; in response to a share operation on the target media content, sharing the target media content with the target user to share with corresponding to the user identification that the share operation is applied to.

12 Claims, 7 Drawing Sheets

(58) Field of Classification Search
CPC .. H04W 92/18; G06F 3/04842; G06F 3/0481; G06F 3/0488; G06F 3/0486; H04L 51/32; H04L 65/403; H04L 51/10; H04L 65/4069; H04N 5/23293
USPC .......................................................... 455/566
See application file for complete search history.

(56) References Cited

U.S. PATENT DOCUMENTS

| | | | | |
|---|---|---|---|---|
| 2015/0373181 | A1* | 12/2015 | Rahman | H04M 1/7243 455/566 |
| 2018/0356961 | A1* | 12/2018 | Lewis | G06Q 50/01 |

FOREIGN PATENT DOCUMENTS

| | | | |
|---|---|---|---|
| CN | 109684110 | A | 4/2019 |
| CN | 111028092 | A | 4/2020 |
| CN | 111258486 | A | 6/2020 |
| CN | 306230846 | S | 12/2020 |
| CN | 112188266 | A | 1/2021 |
| CN | 112312222 | A | 2/2021 |
| CN | 112416223 | A | 2/2021 |
| CN | 113365133 | A | 9/2021 |
| CN | 113419797 | A | 9/2021 |
| CN | 113568699 | A | 10/2021 |
| CN | 114217707 | A | 3/2022 |
| CN | 114399437 | A | 4/2022 |
| CN | 114817630 | A | 7/2022 |
| CN | 115515014 | A | 12/2022 |
| WO | 2018227618 | A1 | 12/2018 |
| WO | 2019228120 | A1 | 12/2019 |
| WO | 2022062578 | A1 | 3/2022 |
| WO | 2022111472 | A1 | 6/2022 |

OTHER PUBLICATIONS

Han, Z., "To explore the application prospect of short video in news information expression," people.cn, Available Online at http://media.people.com.cn/n1/2018/0820/c420858-30239011.html, Aug. 20, 2018, 8 pages, submitted with partial English translation.

ISA China National Intellectual Property Administration, International Search Report and Written Opinion Issued in Application No. PCT/CN2023/115432, Nov. 3, 2023, WIPO, 8 pages.

China National Intellectual Property Administration, Office Action and Search Report Issued in Application No. 202211177498.X Jul. 18, 2023, 11 pages.

"How to share TikTok videos with friends," Gugu Pig, Available Online at guguzhu.com/article/307040.html, Sep. 20, 2020, 6 pages.

Guo Kun et al: "Federated Clique Percolation for Privacy-preserving Overlapping Community Detection", ACM Transactions on Intelligent Systems and Technology, Association for Computing Machinery Corporation, 2 Penn Plaza, Suite 701 New York NY 10121-0701 USA, Jun. 19, 2023, 3 pages.

ISA European Patent Office, International search report and written opinion for application No. PCT/CN2024/099169, mailed on Nov. 21, 2024, 10 pages.

Zheng Zhiwei et al: "Federated Community Detection in Social Networks", Springer International Publishing, Jan. 13, 2023, 11 pages.

* cited by examiner

MEDIA CONTENT SHARING METHOD, APPARATUS, ELECTRONIC DEVICE AND STORAGE MEDIUM

CROSS REFERENCE TO RELATED APPLICATIONS

The present application is a Continuation Application of International Patent Application No. PCT/CN2023/115432, filed Aug. 29, 2023, which claims priority of the Chinese invention patent application with the application number 202211177498.X, filed on Sep. 26, 2022, the entire contents of the application being incorporated herein by reference in its entirety.

FIELD

Embodiments of the present disclosure relate to the technical field of computer, for example, to a method, apparatus, electronic device, and storage medium for sharing media content.

BACKGROUND

In some applications, when a user is watching a video, the user may share the video that is currently being watching with other users through a share panel of the video. However, in related technologies, video sharing methods are relatively monotonous and cannot meet the needs of users.

SUMMARY

Embodiments of the present disclosure provide a media content sharing method, apparatus, electronic device, and storage medium to enrich video sharing methods.

In accordance with a first aspect, embodiments of the present disclosure provide a media content sharing method, comprising: displaying target media content on a media content display page; in response to a display operation on a target user to share with, displaying a user identification of at least one user to share with in a preset area of the media content display page, wherein a background screen of the preset area is associated with the target media content; and in response to a share operation on the target media content, sharing the target media content with the target user to share with corresponding to the user identifications on which the share operation is performed.

In accordance with a second aspect, embodiments of the present disclosure further provide a media content sharing apparatus, comprising: a content display module, configured to display target media content on a media content display page; an identification display module, configured to display user identifications of at least one user to share with in a preset area of the media content display page in response to a display operation on a target user to share with, wherein a background screen of the preset area is associated with the target media content; and a content sharing module, configured to share the target media content with the target user to share with corresponding to the user identification that the share operation is applied to in response to a share operation on the target media content.

In accordance with a third aspect, embodiments of the present disclosure further provide an electronic device, comprising: at least one processor and a memory communicatively connected to the at least one processor; wherein the memory stores a computer program executable by the at least one processor, wherein the computer program is executed by the at least one processor and causes the at least one processor to execute the media content sharing method as described in embodiments of the present disclosure.

In accordance with a fourth aspect, embodiments of the present disclosure further provide a computer-readable storage medium that stores computer instructions. The computer instructions, when executed by a processor, are used to cause the media content sharing method as described in embodiments of the present disclosure.

DETAILED DESCRIPTION OF EMBODIMENTS

Embodiments of the present disclosure will be described below with reference to the drawings. Although some embodiments of the present disclosure are shown in the drawings, it should be understood that the present disclosure may be embodied in various forms and should not be construed as limited to the embodiments set forth herein. Rather, these embodiments are provided so that the present disclosure will be thorough and complete.

It should be understood that multiple steps described in the method embodiments of the present disclosure may be executed in different orders and/or in parallel. Furthermore, method embodiments may include additional steps and/or omit performance of illustrated steps.

As used herein, the term "include" and its variations are open-ended, i.e., "including but not limited to". The term "based on" means "based at least in part on." The term "one embodiment" means "at least one embodiment"; the term "another embodiment" means "at least one additional embodiment"; and the term "some embodiments" means "at least some embodiments". Relevant definitions of other terms will be given in the description below.

It should be noted that concepts such as "first" and "second" mentioned in the present disclosure are only used to distinguish different apparatus, modules or units, and are not intended to limit the sequence or interdependence of the functions performed by these apparatus, modules or units.

It should be noted that the modifications of "one" and "multiple" mentioned in the present disclosure are illustrative and not restrictive. Those skilled in the art will understand that unless the context clearly indicates otherwise, it should be understood as "one or more".

The names of messages or information exchanged between multiple devices in the embodiments of the present disclosure are for illustrative purposes only and are not used to limit the scope of these messages or information.

It can be understood that before using the technical solutions disclosed in the multiple embodiments of the present disclosure, users shall be informed in an appropriate manner of the type, scope of use, usage scenarios, etc. of the personal information involved in the present disclosure in accordance with relevant laws and regulations and the user's authorization shall be obtained.

For example, in response to receiving an active request from a user, a prompt message is sent to the user to clearly remind the user that the operation requested will require the acquisition and use of the user's personal information. Therefore, users can autonomously choose whether to provide personal information to software or hardware such as electronic devices, applications, servers or storage media that perform the operations of the technical solution of the present disclosure based on the prompt information.

As an optional but non-limiting embodiment, in response to receiving the user's active request, the method of sending prompt information to the user may be, for example, a pop-up window, and the prompt information may be presented in the form of text in the pop-up window. In addition, the pop-up window may further contain a selection widget for the user to choose "agree" or "disagree" to provide personal information to the electronic device.

It can be understood that the above process of notifying and obtaining user authorization is only illustrative and does not limit the embodiments of the present disclosure. Other methods that satisfy relevant laws and regulations may also be applied to the embodiments of the present disclosure.

Figure 1:
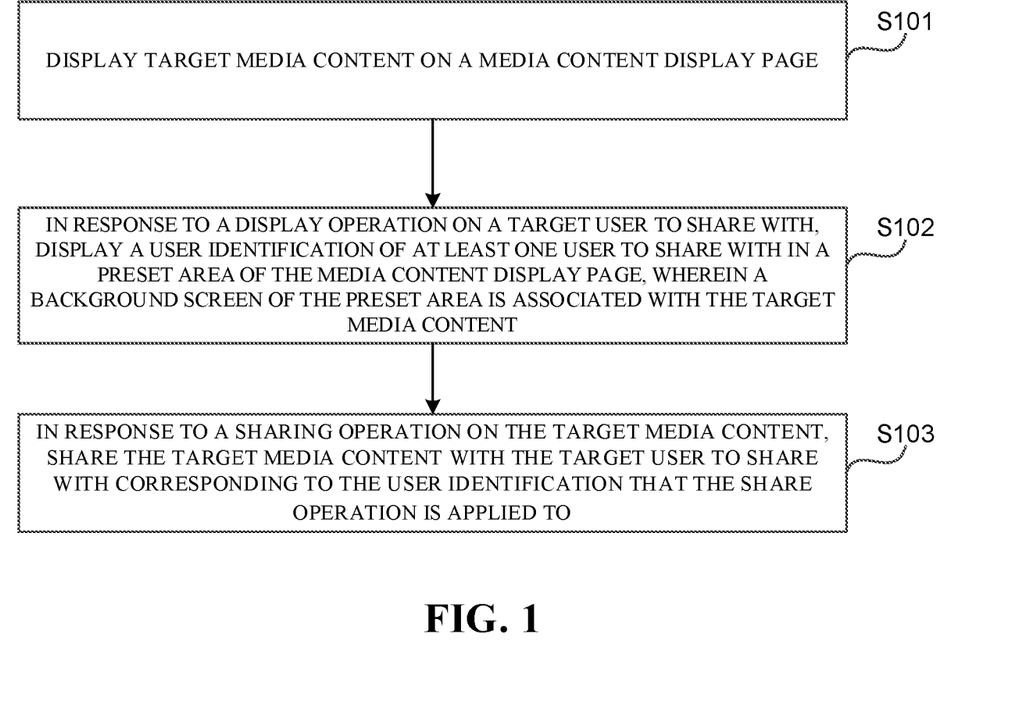
FIG. 1 is a schematic flowchart of a media content sharing method provided by an embodiment of the present disclosure.

FIG. 1 is a schematic flowchart of a media content sharing method provided by an embodiment of the present disclosure. The method may be performed by a media content sharing apparatus, wherein, the apparatus maybe implemented by software and/or hardware, and may be configured in an electronic device, for example, a mobile phone or a tablet computer. The media content sharing method provided by the embodiment of the present disclosure is suitable for quickly sharing the media content that is currently being viewed. As shown in FIG. 1, the media content sharing method provided by the embodiments herein may include the following steps.

S101: displaying target media content on a media content display page.

In the present embodiment, target media content may be displayed on the media content display page.

The media content display page may be a page used to display media content, such as a video play page, etc. The target media content may be the media content currently displayed on the media content display page. The media content may include, for example, video content and/or graphic content. The graphic content may be media content consisting of at least one screen. When displaying graphic content, the screens currently displayed in the media content page may be automatically switched according to preset switching rules and/or switched based on the user's screen switching operations.

S102: in response to a display operation on a target user to share with, displaying a user identification of at least one user to share with in a preset area of the media content display page, wherein a background screen of the preset area is associated with the target media content.

The display operation on the target user to share with may be a display operation from a sharing user for instructing to use a screen associated with the target media content as a background screen to display the user identifications of the users to share with. For example, the display operation may be preset gesture operations that act on the media content display page, long press operations or combo operations that act on the share widgets of the target media content, etc. The media content may have one or more associated screens, and the screens associated with different media content may be different. For example, the target media content may have only one associated screen. As an example, the background screen of the preset area may be determined based on the cover of the target media content, or based on the video frames/pictures in the target media content, etc. or the target media content may only include multiple associated screens, and correspondingly, the background screen of the preset area may be a screen associated with the current display screen of the target media content (that is, the screen that the target media content is currently displaying on the media content display page) and/or the screen of the target media content currently displayed in the preset area, etc.

The preset area may be an area used to display the user identifications of the users to share with using a picture associated with the target media content as the background screen. The preset area may be an associated area or a non-associated area that triggers the display operation on the target user to share with. That is, when the triggering positions of the display operation on the target user to share with are different, the preset areas may be the same or different.

For example, the user identifications of the users to share with can be displayed in a preset area (for example, a distance from the share widget of the target media content is in an area within the preset area) regardless of the triggering position of the display operation on the target user to share with; or considering the triggering position of the operation of the target user to share with, the user identification of the users to share with is displayed in an area associated with the triggering position. As a result, the distance required for the user to move the finger/stylus from performing the display operation on the target user to share with to performing the share operation is shortened, thereby realizing fast sharing of the media content. Optionally, the distance between the preset area and the share widget of the target media content is within a preset distance range. The area associated with each triggering position may be set as needed, for example, it may be an area that includes or does not include the corresponding triggering position, such as an area that is within a preset distance range from the corresponding triggering position. The distance from the share widget/triggering position is within the preset distance range may be that the distance from the center point of the preset area, or from the boundary point on the boundary of the preset area closet to the share widget/triggering position, to the share widget/triggering position is within the preset distance range, etc., which can be set as needed.

The users to share with may be users for a current user to share the target media content with, which may be associated users of the current user, such as friends of the current user and/or users that the current user follows, etc. The user identifications of the users to share with may be the identifications of the users to share with, such as the user avatars and/or user nicknames of the users to share with.

When receiving the display operation on the target user to share with, the screen associated with the target media content may be used as the background screen, and the user identification of the at least one user to share with is displayed in the preset area of the media content display page. For example, the user identifications of the users to share with that are less than or equal to the preset number (such as 4) are displayed in the preset area. Here, in the present embodiment, the method of determining the users whose user identifications are displayed in the preset area to be shared is not limited. For example, the users to share with whose user identifications are displayed in the preset area can be determined based on the intimacy, number of interactions, and/or number of media content sharing between each user to share with and the current user.

Figure 2:
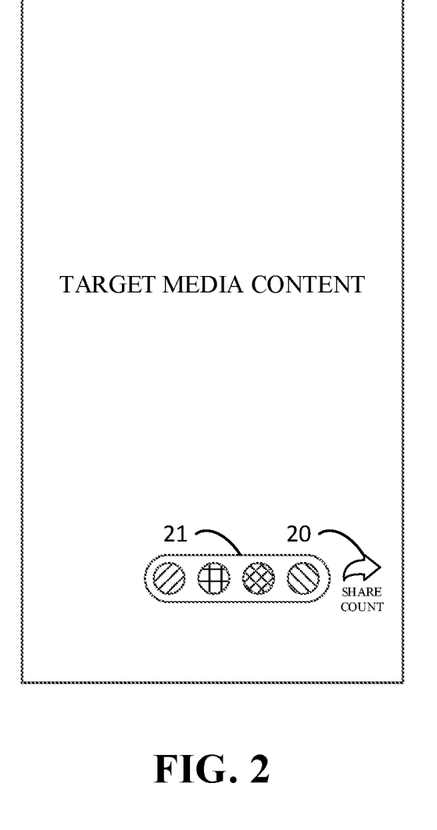
FIG. 2 is a schematic diagram displaying a user identification provided by an embodiment of the present disclosure.
Figure 3:
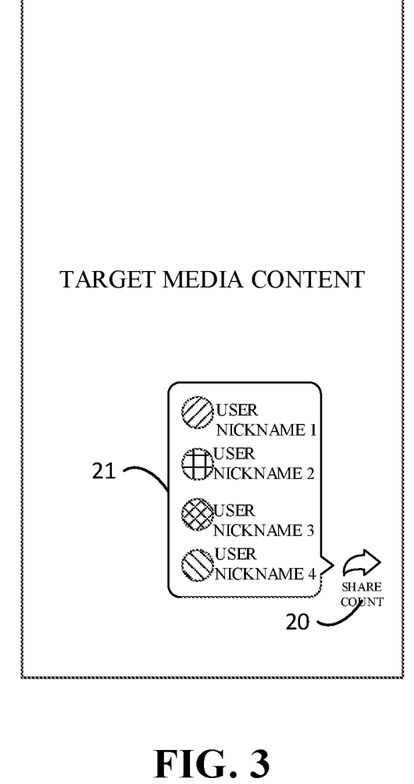
FIG. 3 is a schematic diagram displaying another user identification provided by an embodiment of the present disclosure.

Taking the display operation on the target user to share with as a long press operation acting on the share widget 20 of the target media content as an example, when it is detected that the current user long presses the share widget 20 of the target media content, a screen associated with the media content may be used as the background screen (not shown in the figures), and the user identification of the at least one user to be shared is displayed in a preset area 21 on one side of the share widget 20 and within the preset distance range from the share widget 20, as shown in FIG. 2 and FIG. 3.

S103: in response to a share operation on the target media content, sharing the target media content with the target user to share with corresponding to the user identification that the share operation is applied to.

The share operation may be a triggering operation used to instruct sharing of the target media content, such as a click operation or a sliding operation acting on a user identification displayed in the preset area. The target user to share with may be the user to share with corresponding to the user identification that the share operation is applied to. The user identification acted upon by the share operation may include the user identification acted upon when a triggering of the share operation ends, such as the user identification displayed at the triggering position when the triggering of the share operation ends, etc.

When a share operation for the target media content is received, the user identification on which the share operation is performed and the target user to share with corresponding to the user identification can be determined, and the target media content is shared with the target user to share with.

In the present embodiment, after the target media content is shared to the target user to share with, the user identifications of the users to share with may be kept displayed in the preset area until a triggering operation is received for instructing to stop displaying the user identification of the user to be shared in the preset area. the user identifications of the users to share with may further be stopped displaying in the preset area, so that the user can view the media content screen where the target media content is located in the preset area. At this time, optionally, sharing the target media content to the target user to share with corresponding to the user identification on which the share operation is performed includes: when a triggering of the share operation ends, sharing the target media content to the target user to share with corresponding to the user identification on which the share operation is performed, and cancelling a display of the user identification of the at least one user to share with and the background screen. For example, when the triggering of the share operation ends, the target media content may be shared to the target user to share with, the user identifications of the users to share with may be stopped displaying in the preset area, and the background screen displayed in the preset area is switched to the media content screen (such as the to-be-processed screen) whose target media content is located in the preset area.

In the present embodiment, in addition to the display operation on the target users to share with, the user may further instruct the current application to display the user identifications of at least one user to share with through other display operation on the target users to share with, such as instructing the current application to display the user identifications of at least one user to share with through a display operation on share panel. The display operation on share panel may include, for example, a click operation on a share widget of the target media content and/or a long press operation on a non-widget display area of the media content display page, etc. Therefore, when the current application detects that the current user performs the display operation on the share panel, in response to the display operation on the share panel, the share panel of the target media content may be displayed in the media content display page, and the user identifications of at least one user to share with and at least one interactive widget may be displayed in the share panel. At this time, the current user may further share the target media content through the share panel.

It should be noted that the display operation on the share panel and the display operation on the target users to share with may be different triggering operations. Displaying the user identifications of the users to share with in the form of a share panel and displaying the user identifications of the users to share with in the preset area may be different ways of displaying user identifications. For example, the display area of the share panel may not be associated with the triggering position of the display operation on the share panel and/or the share widget of the target media content, and the share panel may be displayed in the bottom area of the media content display page, and the preset area may be associated with the triggering position of the display operation on the target users to share with and/or the share widget of the target media content; and/or, in the share panel, in addition to displaying the user ID of the user to be shared, at least one interactive widget may further be displayed, such as a feedback widget/report widget, a double-speed playback widget, and/or an application widget corresponding to different applications for sharing target media content to friends in the corresponding application, etc., and in the preset area, only the user identifications of the users to share with may be displayed.

The media content sharing method provided by the present embodiment, comprises: displaying target media content on a media content display page; in response to a display operation on target users to share with, displaying a user identification of at least one user to share with in a preset area of the media content display page, wherein a background image of the preset area is associated with the target media content; in response to a share operation on the target media content, sharing the target media content with the target user to share with corresponding to the user identification that the share operation is applied to. The present embodiment adopts the above technical solution and uses the background screen associated with the media content to display the user identifications of the users to share with in the preset area, which can enrich the display method of the user identifications, and further enrich the sharing methods of media content to meet users' needs for sharing.

Figure 4:
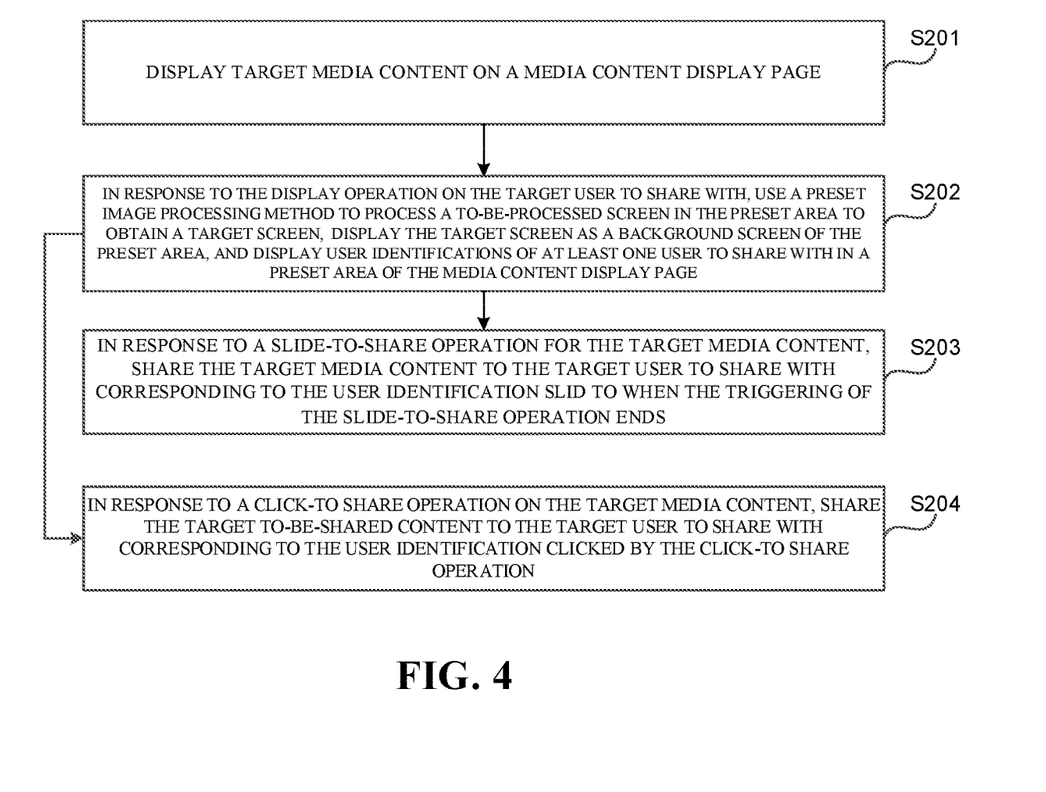
FIG. 4 is a schematic flowchart of another media content sharing method provided by an embodiment of the present disclosure.

FIG. 4 is a schematic flowchart of another media content sharing method provided by an embodiment of the present disclosure. The solutions in the present embodiment can be combined with one or more optional solutions in the above embodiments. Optionally, the media content sharing method provided by the present embodiment further comprises: in response to the display operation on a target user to share with, using a preset screen processing method to process a to-be-processed screen in the preset area to obtain a target screen, and displaying the target screen as a background screen of the preset area.

Optionally, in response to a share operation on the target media content, sharing the target media content with the target user to share with corresponding to the user identification that the share operation is applied to, comprises at least one of the following: in response to a slide-to-share operation for the target media content, sharing the target media content to the target user to share with corresponding to the user identification that is slid to when a triggering of the slide-to-share operation ends; and in response to a click-to-share operation on the target media content, sharing a target to-be-shared content to the target user to share with corresponding to the user identification that is clicked on by the click-to-share operation.

As shown in FIG. 4, the media content sharing method provided in the present embodiment may comprise the following steps.

S201: displaying target media content on a media content display page.

S202: in response to the display operation on a target user to share with, using a preset screen processing method to process a to-be-processed screen in the preset area to obtain a target screen, displaying the target screen as a background screen of the preset area, displaying the user identification of the at least one user to share with in the preset area, and execute S203 or S204.

The to-be-processed screen may be the screen located in the in the preset area in a video frame/image of the target media content, such as the picture located in the preset area in the video frame/image of the target media content currently displayed in the media content display page. The preset image processing method may be a preset image processing method, and the present embodiment does not limit the preset image processing method. Optionally, the preset image processing method may be Gaussian blur processing, so that the user may roughly understand the screen content of the target media content located in the preset area in the video frame/image currently displayed in the media content display page through the background screen of the preset area, on the premise of ensuring that the user identifications may be clearly displayed, which avoids the situation where the current user is completely unable to understand the screen content where the target media content is located in the preset area.

In the present embodiment, the background screen of the preset area may be a screen associated with the screen located in the preset area among the video frame/image of the target media content currently displayed in the media content display page.

For example, after the video frame/image in the target media content is displayed on the media content display page, a preset image processing method may be used to process the to-be-processed image of the video frame/image located in the preset area to obtain the target image, and replace the to-be-processed screen in the video frame/image with the target image; or before the video frame/image in the target media content is displayed on the media content display page, the to-be-processed screen of the video frame/image may be pre-processed. For example, before the video frame/picture in the target media content is displayed on the media content display page, the preset picture processing method is used in advance to process the to-be-processed screen located in the preset area when the video frame/image is displayed, to obtain the target screen, and the to-be-processed screen in the video frame/image is replaced with the target screen.

It can be understood that after the target screen is determined, the to-be-processed screen in the corresponding video frame/image may require no replacement with the target screen as well. For example, when a video frame/image is displayed on the media content display page, the target screen determined based on the to-be-processed screen may be directly displayed on the upper layer of the to-be-processed screen in the video frame/image, and the user identifications of the users to share with may be displayed on the upper layer of the target screen, which can be set as needed.

In the present embodiment, when the to-be-processed screen in the preset area in the media content display page changes, such as when the video frame/image displayed in the media content display page changes, the background screen of the preset area may be updated to a target screen corresponding to the changed to-be-processed screen. At this time, optionally, after displaying the user identification of the at least one users to share with in the preset area of the media content display page, it further comprises: in case that a change occurs to a to-be-processed screen in the preset area, updating the background screen of the preset area according to the to-be-processed screen after change.

S203: in response to a slide-to-share operation for the target media content, sharing the target media content to the target user to share with corresponding to the user identification that is slid to when a triggering of the slide-to-share operation ends.

The slide-to-share operation may be a triggering operation to share the target media content by sliding, such as a sliding operation in which the end position of the sliding is located at a user identification displayed in a preset area, etc.

In the present embodiment, the user identifications displayed in the preset area may support the user to share the target media content by sliding.

When receiving the slide-to-share operation by the user, for example, when it is detected that the touch point is located at the display position of a user identification in the preset area when the current user's sliding ends, the target media content may be shared to the user to share with corresponding to the user identification located at the end of the user's sliding.

In the present embodiment, the slide-to-share operation may comprise a sliding operation that is triggered again after the end of the triggering of the display operation by the target user to be shared is completed. For example, the sliding operation is performed after the display operation on the target user to share with is completed (that is, after the touch point disappears).

In the present embodiment, the slide-to-share operation may further comprise a sliding operation performed by switching the display operation on the target user to share with when the triggering of the display operation on the target user to share with does not ends (for example, the touch point of the display operation on the target user to share with does not disappear), so as to reduce the user's operational difficulty and avoid mistaken sharing. Taking the display operation on the target user to share with as a long press operation on the share widget of the target media content as an example, after the current user instructs the current application to display the user identifications of at least one user to share with in the preset area by long pressing, he may keep pressing (i.e. without lifting his finger/stylus) and slide to the user identification of the target user to share with to share the target media content; therefore, after the current application detects that the current user long presses the share widget of the target media content and starts sliding, it can be determined whether the user identification is displayed at the position when the sliding of the current user ends, and when the user identification is displayed, the target media content is shared with the target user to share with corresponding to the user identification. At this time, optionally, the slide-to-share operation is executed by switching the display operation on the target user to share with, wherein a continuous triggering is maintained when the display operation on the target user to share with is switched to the slide-to-share operation.

In the present embodiment, when the user slides to a display position of a user identification, the display size of the user identification that the user currently slides to may be adjusted or not adjusted. Optionally, the display size of the user identification that the user currently slides to may be adjusted to facilitate the user to determine the user identification that the user currently slides to. In addition, after adjusting the display size of the user identification that the user slides to, the area size of the preset area may further be adjusted according to the adjusted display size of the multiple user identifications, so that the preset area can fully display the multiple user identifications, and it can be ensured that the spacing between the multiple user identifications is not too large or too small. At this time, optionally, the media content sharing method provided by the present embodiment may further comprise: during the triggering process of the slide-to-share operation, using different display sizes to display the user identification that the slide-to-share operation is currently sliding to and the user identification that the slide-to-share operation is not currently sliding to, and adjusting the area size of the preset area according to the display size of the user identification currently slid to by the slide-to-share operation and the display size of the user identification currently not slid to by the slide-to-share operation.

Figure 5:
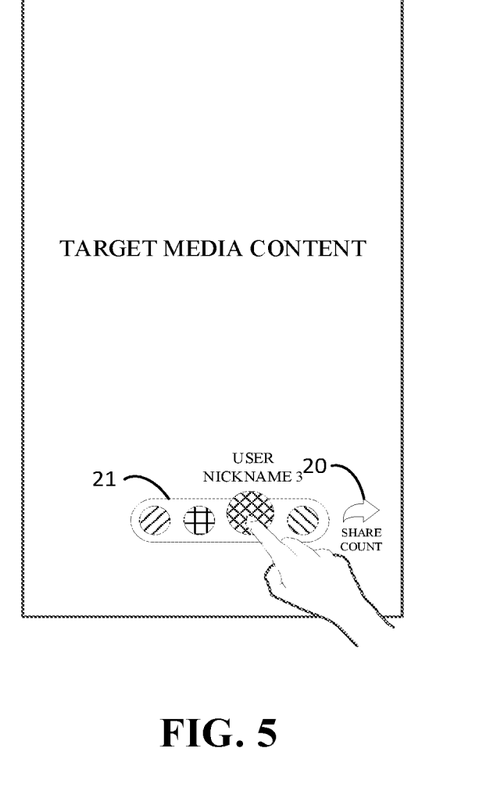
FIG. 5 is a schematic diagram displaying yet another user identification provided by an embodiment of the present disclosure.

Taking increasing the display size of the user identification that the user currently slides to as an example, when the user does not slide to the display position of any user identification, multiple user identifications may be displayed in the preset area 21 using the initial display size, as shown in FIG. 2. When the user slides to the display position of a user identification, the display size of the user identification that the user is currently sliding to may be increased from the initial display size to the target display size, and the initial display size is used to display other user identifications other than the user identification that the user is currently sliding to; and according to the display size of multiple user identifications in the preset area 21 after increasing the display size of the user identification, the area size of the preset area 21 is determined, and the determined area size is used to display the preset area 21, as shown in FIG. 5.

When the display size of the user identification that the user is currently sliding to is increased from the initial display size to the target display size, for example, a center point of the user identification may be used as the center to increase the user identification from the initial display size to the target display size; an intersection point of a center line (such as a vertical center line or a horizontal center line) of the user identification and its boundary may further be used as the center to increase the user logo from the initial display size to the target display size, etc., which may be set as needed.

When determining the area size of the preset area 21 based on the display sizes of multiple user identifications, for example, the spacing between adjacent boundaries (i.e. the closer boundary) between adjacent user identifications may be kept unchanged, and the area size of the preset area 21 may be determined based on the display sizes of multiple user identifications and the spacing between adjacent boundaries between adjacent user identifications. In addition, after the area size of the preset area 21 is determined, the center point of the preset area 21, a boundary of the preset area 21, or a point on the boundary of the preset area 21 (for example, an intersection point between the vertical centerline or horizontal centerline of the preset area 21 and its boundary) may be kept unchanged, and the display size of the preset area 21 may be adjusted. For example, when the preset area 21 is located on the left side of the share widget of the target media content and multiple user identifications are arranged horizontally in the preset area 21, the right border of the preset area 21 may be kept unchanged, the horizontal spacing between the rightmost boundary point of the user ID on the left and the leftmost boundary point of the user ID on the right of adjacent user ID pairs may be kept unchanged, and the width of the preset area 21 may be increased to the left, as shown in FIG. 5.

In addition, if the user nicknames of the users to share with are not displayed in the preset area 21 (as shown in FIG. 2), that is, if the user identifications displayed in the preset area 21 do not include the user nicknames of the users to share with, when the user slides to the display position of a user identification, the user nickname corresponding to the user identification that the user currently slides to may be additionally displayed. For example, the user nicknames corresponding to the user identifications are displayed at the associated position of the user identifications, as shown in FIG. 5; if the user nicknames of the users to share with are displayed in the preset area 21 (as shown in FIG. 3), that is, if the user identifications displayed in the preset area 21 include the user nicknames of the users to share with, when the user slides to the display position of a user identification, the user nicknames contained in the user identifications may remain displayed.

S204: in response to a click-to-share operation on the target media content, sharing a target to-be-shared content to the target user to share with corresponding to the user identification that is clicked on by the click-to-share operation.

The click-to-share operation may be a triggering operation to share the target media content by clicking, such as a click operation acting on a user identification displayed in a preset area.

In the present embodiment, the user identifications displayed in the preset area may support the user to share the target media content by clicking.

When a click-to-share operation by the user is received, for example, when it is detected that the current user clicks on a user identification displayed in the preset area, the target media content can be shared with the user to share with corresponding to the user identification.

It can be understood that the target media content is shared to the target user to share with, for example, when the target media content is successfully shared, prompt information may be displayed on the media content display page to prompt the user that the target media content is successfully shared. For example, the prompt information may be stopped when the stop display operation by the current user is received, and/or when the display duration of the prompt information reaches a preset duration (such as 1s, etc.).

The media content sharing method provided in the present embodiment can dynamically update the background screen of the preset area, and support users to use different triggering methods to share target media content, which can enrich the display method of the user identifications, and the sharing methods of media content to meet different needs of the users.

Figure 6:
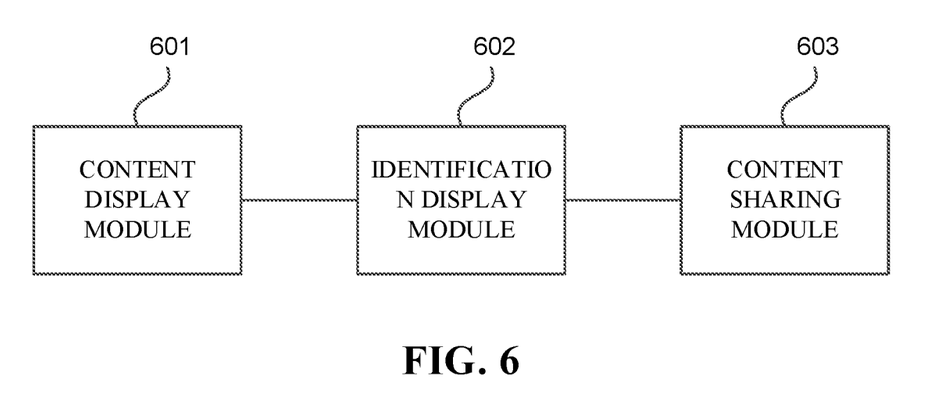
FIG. 6 is a structural block diagram of a media content sharing apparatus provided by an embodiment of the present disclosure.

FIG. 6 is a structural block diagram of a media content sharing apparatus provided by an embodiment of the present disclosure. The apparatus may be implemented by software and/or hardware and may be configured in electronic devices. For example, it may be configured in a mobile phone or tablet computer, and the scene of the currently displayed media content may be quickly shared by executing a media content sharing method. As shown in FIG. 6, the media content sharing apparatus provided in the present embodiment may comprise: a content display module 601, configured to display target media content on a media content display page; an identification display module 602, configured to display a user identification of at least one user to share with in a preset area of the media content display page in response to a display operation on a target user to share with, wherein a background screen of the preset area is associated with the target media content; and a content sharing module 603, configured to share the target media content with the target user to share with corresponding to the user identification that the share operation is applied to in response to a share operation on the target media content.

The media content sharing apparatus provided by the present embodiment displays, through a content display module, target media content on a media content display page; displays, through the identification display module, user identifications of at least one user to share with in a preset area of the media content display page in response to a display operation on a target user to share with, wherein a background screen of the preset area is associated with the target media content; and shares, through a content sharing module, the target media content with the target user to share with corresponding to the user identification that the share operation is applied to in response to a share operation on the target media content. The present embodiment adopts the above technical solution and uses the background screen associated with the media content to display the user identifications of the users to share with in the preset area, which can enrich the display method of the user identifications, and further enrich the sharing methods of media content to meet users' needs for sharing.

In the above embodiment, the identification display module 602 may be further configured to: in response to the display operation on a target user to share with, use a preset screen processing method to process a to-be-processed screen in the preset area to obtain a target screen, and display the target screen as a background screen of the preset area.

The media content sharing apparatus provided by the present embodiment may further comprise: a screen update module, configured to update the background screen of the preset area according to the to-be-processed screen when the to-be-processed screen in the preset area changes, after the user identifications of at least one user to share with are displayed in the preset area of the media content display page, In the above solution, the distance between the preset area and the share widget of the target media content is within a preset distance range.

In the above solution, the content sharing module 603 may comprise at least one of the following: a slide-to-share unit, configured to share the target media content to the target user to share with corresponding to the user identification that is slid to when a triggering of the slide-to-share operation ends, in response to a slide-to-share operation for the target media content; and a click-to-share unit, configured to share a target to-be-shared content to the target user to share with corresponding to the user identification that is clicked on by the click-to-share operation, in response to a click-to-share operation on the target media content.

In the above solution, the slide-to-share operation may be executed by switching the display operation on a target user to share with, wherein a continuous triggering may be maintained when the display operation on a target user to share with is switched to the slide-to-share operation.

The media content sharing apparatus provided by the present embodiment may further comprise: a size adjustment module, using different display sizes to display the user identification that the slide-to-share operation is currently sliding to and the user identification that the slide-to-share operation is not currently sliding to, and adjusting the area size of the preset area according to the display size of the user identification currently slid to by the slide-to-share operation and the display size of the user identification currently not slid to by the slide-to-share operation, during the triggering process of the slide-to-share operation.

In the above solution, the content sharing module 603 may be configured to: when a triggering of the share operation ends, sharing the target media content to the target user to share with corresponding to the user identification on which the share operation is performed, and cancelling a display of the user identification of the at least one user to share with and the background screen.

The media content sharing apparatus provided by the embodiment of the present disclosure may execute the media content sharing method provided by any embodiment of the present disclosure, and has corresponding functional modules for executing the media content sharing method. For technical details not described in the present embodiment, please refer to the media content sharing method provided by any embodiment of the present disclosure.

Figure 7:
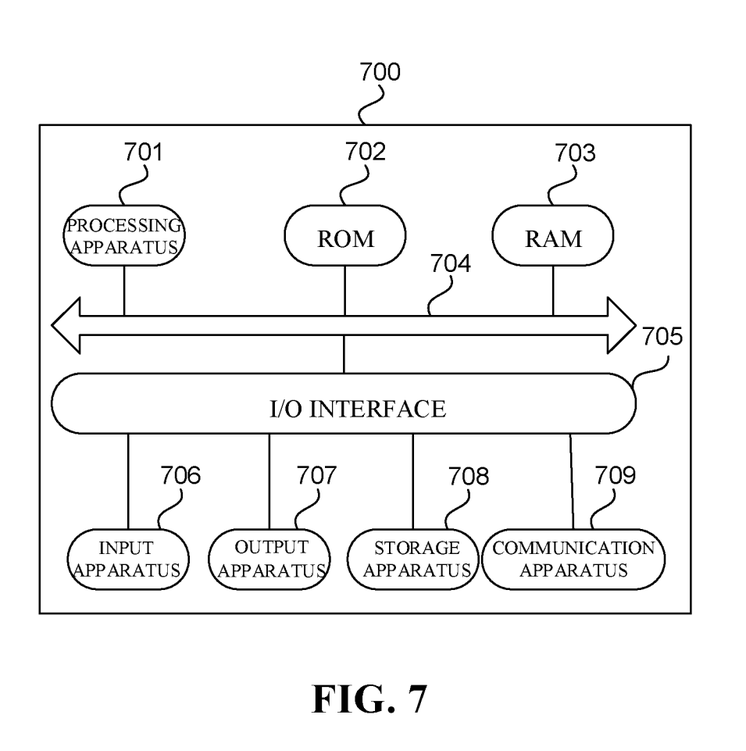
FIG. 7 is a schematic structural diagram of an electronic device provided by an embodiment of the present disclosure.

Referring to FIG. 7, FIG. 7 illustrates a structural schematic diagram of an electronic device (e.g., a terminal device) 700 provided by an embodiment of the present disclosure. The terminal device in the embodiment of the present disclosure may include, but are not limited to, mobile terminals, such as mobile phones, laptops, digital broadcast receivers, Personal Digital Assistants (PDAs), Portable Android Devices (PADs), Portable Media Players (PMPs), vehicle-mounted terminals (e.g. vehicle-mounted navigation terminals), etc., and fixed terminals such as digital televisions (TVs), desktop computers, etc. The electronic device shown in FIG. 7 is only an example and should not impose any limitations on the functions and scope of use of the embodiment of the present disclosure.

As shown in FIG. 7, the electronic device 700 may comprise a processing apparatus (e.g., a central processing unit, a graphics processor, etc.) 701 that may execute a variety of appropriate actions and processes based on programs stored in a Read-Only memory (ROM) 702 or loaded from the storage apparatus 708 into the Random Access Memory (RAM) 703. In the RAM 703, various programs and data required for the operation of the electronic device 700 are further stored. The processing apparatus 701, the ROM 702 and the RAM 703 are connected to each other via a bus 704. An Input/Output (I/O) interface 705 is further connected to bus 704.

Generally, the following apparatus may be connected to the I/O interface 705: an input apparatus 706 including, for example, a touch screen, a touch pad, a keyboard, a mouse, a camera, a microphone, an accelerometer, a gyroscope, etc.;

an output apparatus 707 including, for example, a liquid crystal display (LCD), a speaker, a vibrator, etc.; a storage apparatus 708 including, for example, a magnetic tape, a hard disk, etc.; and a communication apparatus 709. The communication apparatus 709 may allow electronic device 700 to communicate wirelessly or wiredly with other devices to exchange data. Although FIG. 7 illustrates an electronic device 700 having various means, it should be understood that implementation or availability of all illustrated devices is not required. More or fewer means may alternatively be implemented or provided.

According to the embodiment of the present disclosure, the processes described above with reference to the flowchart may be implemented as a computer software program. For example, the embodiments of the present disclosure comprise a computer program product including a computer program carried on a non-transitory computer-readable medium, the computer program containing program code for performing the method illustrated in the flowchart. In such embodiment, the computer program may be downloaded and installed from the network via communication apparatus 709, or from storage apparatus 708, or from ROM 702. When the computer program is executed by the processing apparatus 701, the above functions defined in the method of the embodiment of the present disclosure are performed.

It should be noted that the above computer-readable medium in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. Examples of computer-readable storage media may include, but are not limited to: electrical connections having one or more wires, portable computer disks, hard drives, RAM, ROM, Erasable Programmable Read-Only Memory (EPROM), flash memory, optical fibers, portable Compact Disc Read-Only Memory (CD-ROM), optical storage devices, magnetic storage devices, or any suitable combination of the above. In the present disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the above. A computer-readable signal medium may further be any computer-readable medium other than a computer-readable storage medium that can send, propagate, or transmit a program for use by or in connection with an instruction execution system, apparatus, or device. Program code contained on a computer-readable medium may be transmitted using any appropriate medium, including but not limited to: wires, optical cables, Radio Frequency (RF), etc., or any suitable combination of the above.

In some embodiments, the client/server may communicate utilizing any currently known or future developed network protocol, such as HyperText Transfer Protocol (HTTP), and may be interconnected with any form or medium of digital data communications (e.g., a communications network). Examples of communication networks include Local Area Networks (LANs), Wide Area Networks (WANs), International Networks (e.g., the Internet), and end-to-end networks (e.g., ad hoc end-to-end networks) and any current network for knowledge or future research and development.

The above computer-readable medium may be included in the above-mentioned electronic device; it may also exist independently without being assembled into the electronic device.

The computer-readable medium carries one or more programs. When the above one or more programs are executed by the electronic device, the electronic device: displays target media content on a media content display page; in response to a display operation on a target user to share with, displays user identifications of at least one user to share with in a preset area of the media content display page, wherein a background screen of the preset area is associated with the target media content; and in response to a share operation on the target media content, shares the target media content with the target user to share with corresponding to the user identification that the share operation is applied to.

Computer program code for performing the operations of the present disclosure may be written in one or more programming languages, or a combination thereof. The above programming languages include, but are not limited to, object-oriented programming languages such as Java, Smalltalk, and C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In situations involving remote computers, the remote computer may be connected to the user's computer through any kind of network, including a LAN or WAN, or may be connected to an external computer (such as through the Internet using an Internet service provider).

The flowcharts and block diagrams in the drawings illustrate the architecture, functionality, and operations of possible implementations of systems, methods, and computer program products according to various embodiments of the present disclosure. In this regard, each block in the flowchart or block diagram may represent a module, segment, or portion of code, containing one or more executable instructions for implementing the specified logical function. It should also be noted that, in some alternative implementations, the functions noted in the block may occur out of the order noted in the drawings. For example, two blocks shown one after another may actually execute substantially in parallel, or they may sometimes execute in the reverse order, depending on the functionality involved. It should be noted that each block of the block diagram and/or flowchart illustration, and combinations of blocks in the block diagram and/or flowchart illustration, may be implemented by special purpose hardware-based systems that perform the specified functions or operations, or may be implemented using a combination of special purpose hardware and computer instructions.

The units involved in the embodiments of the present disclosure may be implemented in software or hardware. The name of a module in a case does not constitute a qualification of the unit itself.

The functions described above herein may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSP), System on Chips (SOCs), and Complex Programmable Logic Devices (CPLDs), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but are not limited to, electronic, magnetic, optical, electromagnetic, infrared, or semiconductor systems, devices or devices, or any suitable combination of the above. More specific examples of machine-readable storage medium may include an electrical connection based on one or more wires, a portable computer disk, a hard disk, a RAM, a ROM, a EPROM or a flash memory, an optical fiber, CD-ROM, an optical storage device, a magnetic storage device, or any suitable combination of the above.

According to one or more embodiments of the present disclosure, Example 1 provides a media content sharing method, comprising: displaying target media content on a media content display page; in response to a display operation on a target user to share with, displaying a user identification of at least one user to share with in a preset area of the media content display page, wherein a background screen of the preset area is associated with the target media content; and in response to a share operation on the target media content, sharing the target media content with the target user to share with corresponding to the user identification that the share operation is applied to.

According to one or more embodiments of the present disclosure, Example 2 is based on the method described in Example 1, wherein the method further comprises: in response to the display operation on a target user to share with, using a preset screen processing method to process a to-be-processed screen in the preset area to obtain a target screen, and displaying the target screen as a background screen of the preset area.

According to one or more embodiments of the present disclosure, Example 3 is based on the method described in Example 1, wherein after displaying a user identification of at least one user to share with in a preset area of the media content display page, the method further comprises: in case that a change occurs to a to-be-processed screen in the preset area, updating the background screen of the preset area according to the to-be-processed screen after change.

According to one or more embodiments of the present disclosure, Example 4 is based on the method described in Example 1, wherein the distance between the preset area and the share widget of the target media content is within a preset distance range.

According to one or more embodiments of the present disclosure, Example 5 is based on the method described in any one of Examples 1-4, wherein in response to a share operation on the target media content, sharing the target media content with the target user to share with corresponding to the user identification that the share operation is applied to, comprising at least one of the following: in response to a slide-to-share operation for the target media content, sharing the target media content to the target user to share with corresponding to the user identification that is slid to when a triggering of the slide-to-share operation ends; and in response to a click-to-share operation on the target media content, sharing a target to-be-shared content to the target user to share with corresponding to the user identification that is clicked on by the click-to-share operation.

According to one or more embodiments of the present disclosure, Example 6 is based on the method described in Example 5, wherein the slide-to-share operation is executed by switching the display operation on a target user to share with, wherein a continuous triggering is maintained when the display operation on a target user to share with is switched to the slide-to-share operation.

According to one or more embodiments of the present disclosure, Example 7 is based on the method described in Example 5, wherein the method further comprises: during the triggering process of the slide-to-share operation, using different display sizes to display the user identification that the slide-to-share operation is currently sliding to and the user identification that the slide-to-share operation is not currently sliding to, and adjusting the area size of the preset area according to the display size of the user identification currently slid to by the slide-to-share operation and the display size of the user identification currently not slid to by the slide-to-share operation.

According to one or more embodiments of the present disclosure, Example 8 is based on the method described in any one of Examples 1-4, wherein, sharing the target media content with the target user to share with corresponding to the user identification that the share operation is applied to, comprises: when a triggering of the share operation ends, sharing the target media content to the target user to share with corresponding to the user identification on which the share operation is performed, and cancelling a display of the user identification of the at least one user to share with and the background screen.

According to one or more embodiments of the present disclosure, Example 9 provides a media content sharing apparatus, comprising: a content display module, displaying target media content on a media content display page; an identification display module, displaying a user identification of at least one user to share with in a preset area of the media content display page in response to a display operation on a target user to share with, wherein a background screen of the preset area is associated with the target media content; and a content sharing module, sharing the target media content with the target user to share with corresponding to the user identification that the share operation is applied to in response to a share operation on the target media content.

According to one or more embodiments of the present disclosure, Example 10 provides an electronic device, comprising at least one processor; and a memory communicatively connected to the at least one processor; wherein the memory stores a computer program executable by the at least one processor, wherein the computer program is executed by the at least one processor, so that the at least one processor can execute the media content sharing method according to any one of Examples 1-8.

According to one or more embodiments of the present disclosure, Example 11 provides a computer-readable storage medium storing computer instructions, the computer instructions being used to enable a processor to implement the media content sharing method described in any one of Examples 1-8 when executed.

The above description is merely an illustration of the embodiments of the present disclosure and the technical principles applied. Those skilled in the art should understand that the disclosure scope involved in the present disclosure is not limited to technical solutions composed of specific combinations of the above technical features, but should also cover other technical solutions may be formed by any combination of the above technical features or their equivalent features without departing from the above disclosed concept. For example, a technical solution is formed by replacing the above features with technical features with similar functions disclosed in this disclosure (but not limited to).

Furthermore, although various operations are depicted in a specific order, this should not be understood as requiring that these operations be performed in the specific order shown or performed in a sequential order. Under certain circumstances, multitasking and parallel processing may be advantageous. Likewise, although there are many implementation details included in the discussion above. Some features that are described in the context of separate embodiments can also be implemented in combination in a single embodiment. Conversely, various features that are described in the context of a single embodiment can also be implemented in multiple embodiments separately or in any suitable sub-combination.

The invention claimed is:

1. A media content sharing method, comprising:
 displaying a target media content on a media content display page;
 in response to a display operation on a target user to share with, displaying a user identification of at least one user to share with in a preset area of the media content display page, wherein a background screen of the preset area is associated with the target media content;
 in response to a share operation on the target media content, sharing the target media content with the target user to share with corresponding to the user identification that the share operation is applied to;
 in response to the display operation on the target user to share with, using a preset screen processing method to process a to-be-processed screen in the preset area to obtain a target screen, and displaying the target screen as the background screen of the preset area; and
 during a triggering process of a slide-to-share operation, using different display sizes to display the user identification that the slide-to-share operation is currently sliding to and the user identification that the slide-to-share operation is not currently sliding to, and adjusting an area size of the preset area according to a display size of the user identification that the slide-to-share operation is currently sliding to and the display size of the user identification the slide-to-share operation is not currently sliding to; and
 wherein a distance between the preset area and a share widget of the target media content is within a preset distance range.

2. The method of claim 1, wherein after displaying the user identification of the at least one user to share with in the preset area of the media content display page, the method further comprises:
 upon determining that a change occurs to the to-be-processed screen in the preset area, updating the background screen of the preset area according to the to-be-processed screen after change.

3. The method of any one of claim 1, wherein in response to the share operation on the target media content, sharing the target media content with the target user to share with corresponding to the user identification that the share operation is applied to comprises at least one of the following:
 in response to the slide-to-share operation for the target media content, sharing the target media content to the target user to share with corresponding to the user identification that is slid to when a triggering of the slide-to-share operation ends; and
 in response to a click-to-share operation on the target media content, sharing a target to-be-shared content to the target user to share with corresponding to the user identification that is clicked on by the click-to-share operation.

4. The method of claim 3, wherein the slide-to-share operation is executed by switching the display operation on the target user to share with, wherein a continuous triggering is maintained when the display operation on the target user to share with is switched to the slide-to-share operation.

5. The method of any one of claim 1, wherein sharing the target media content with the target user to share with corresponding to the user identification that the share operation is applied to comprises:
 upon determining that a triggering of the share operation ends, sharing the target media content to the target user to share with corresponding to the user identification that the share operation is applied to, and canceling a display of the user identification of the at least one user to share with and the background screen.

6. An electronic device, comprising:
 at least one processor; and
 a memory communicatively connected to the at least one processor, wherein
 the memory stores a computer program executable by the at least one processor, wherein the computer program is executed by the at least one processor, causing the processor to:
 display a target media content on a media content display page;
 in response to a display operation on a target user to share with, display a user identification of at least one user to share with in a preset area of the media content display page, wherein a background screen of the preset area is associated with the target media content;
 in response to a share operation on the target media content, share the target media content with the target user to share with corresponding to the user identification that the share operation is applied to;
 in response to the display operation on the target user to share with, use a preset screen processing method to process a to-be-processed screen in the preset area to obtain a target screen, and display the target screen as the background screen of the preset area; and
 during a triggering process of a slide-to-share operation, use different display sizes to display the user identification that the slide-to-share operation is currently sliding to and the user identification that the slide-to-share operation is not currently sliding to, and adjust an area size of the preset area according to a display size of the user identification that the slide-to-share operation is currently sliding to and the display size of the user identification the slide-to-share operation is not currently sliding to; and
 wherein a distance between the preset area and a share widget of the target media content is within a preset distance range.

7. The electronic device of claim 6, wherein after the processor being caused to display the user identification of the at least one user to share with in the preset area of the media content display page, the processor is further caused to:
 in response to a change occurs to the to-be-processed screen in the preset area, update the background screen of the preset area according to the to-be-processed screen after change.

8. The electronic device of claim 6, wherein in response to the share operation on the target media content, the processor being caused to share the target media content with the target user to share with corresponding to the user identification that the share operation is applied to includes being caused to:
- in response to the slide-to-share operation for the target media content, share the target media content to the target user to share with corresponding to the user identification that is slid to when a triggering of the slide-to-share operation ends; and
- in response to a click-to-share operation on the target media content, share the target to-be-shared content to the target user to share with corresponding to the user identification that is clicked on by the click-to-share operation.

9. The electronic device of claim 8, wherein the slide-to-share operation is executed by switching the display operation on the target user to share with, wherein a continuous triggering is maintained when the display operation on the target user to share with is switched to the slide-to-share operation.

10. The electronic device of claim 6, wherein the processor being caused to share the target media content with the target user to share with corresponding to the user identification that the share operation is applied to includes being caused to:
- in response to a triggering of the share operation ends, share the target media content to the target user to share with corresponding to the user identification that the share operation is applied to, and canceling a display of the user identification of the at least one user to share with and the background screen.

11. A non-transitory computer-readable storage medium, wherein the non-transitory computer-readable storage medium stores computer instructions, the computer instructions, when executed by a processor, causing the processor to:
- display a target media content on a media content display page;
- in response to a display operation on a target user to share with, display a user identification of at least one user to share with in a preset area of the media content display page, wherein a background screen of the preset area is associated with the target media content;
- in response to a share operation on the target media content, share the target media content with the target user to share with corresponding to the user identification that the share operation is applied to; and
- in response to the display operation on the target user to share with, use a preset screen processing method to process a to-be-processed screen in the preset area to obtain a target screen, and display the target screen as the background screen of the preset area; and
- during a triggering process of a slide-to-share operation, use different display sizes to display the user identification that the slide-to-share operation is currently sliding to and the user identification that the slide-to-share operation is not currently sliding to, and adjust an area size of the preset area according to a display size of the user identification that the slide-to-share operation is currently sliding to and the display size of the user identification the slide-to-share operation is not currently sliding to; and
- wherein a distance between the preset area and a share widget of the target media content is within a preset distance range.

12. The non-transitory computer-readable storage medium of claim 11, wherein after the processor being caused to display the user identification of the at least one user to share with in the preset area of the media content display page, the processor is further caused to:
- in response to a change occurs to the to-be-processed screen in the preset area, update the background screen of the preset area according to the to-be-processed screen after change.

* * * * *